(12) United States Patent
Geithner

(10) Patent No.: US 9,342,217 B2
(45) Date of Patent: *May 17, 2016

(54) CONCENTRIC HIERARCHICAL LIST BROWSER

(71) Applicant: Ralf Wolfgang Geithner, Schwetzinger (DE)

(72) Inventor: Ralf Wolfgang Geithner, Schwetzinger (DE)

(73) Assignee: SAP SE, Walldorf (DE)

( * ) Notice: Subject to any disclaimer, the term of this patent is extended or adjusted under 35 U.S.C. 154(b) by 351 days.

This patent is subject to a terminal disclaimer.

(21) Appl. No.: 13/968,859

(22) Filed: Aug. 16, 2013

(65) Prior Publication Data

US 2013/0339904 A1    Dec. 19, 2013

Related U.S. Application Data

(63) Continuation-in-part of application No. 13/243,918, filed on Sep. 23, 2011, now Pat. No. 9,075,503.

(30) Foreign Application Priority Data

Sep. 18, 2012  (EP) .................................... 12184874

(51) Int. Cl.
  *G06F 3/0482*  (2013.01)
  *G06F 3/0488*  (2013.01)
  *G06F 3/0481*  (2013.01)

(52) U.S. Cl.
  CPC ............ *G06F 3/0482* (2013.01); *G06F 3/0488* (2013.01); *G06F 3/04817* (2013.01)

(58) Field of Classification Search
  CPC . G06F 3/0482; G06F 3/0481; G06F 3/04812; G06F 3/04842; G06F 3/0362; G06F 3/04817
  See application file for complete search history.

(56) References Cited

U.S. PATENT DOCUMENTS

| 7,111,788 B2 * | 9/2006 | Reponen ............... G06F 3/0362 235/472.01 |
| 2012/0124520 A1* | 5/2012 | Samp ................... G06F 3/04886 715/834 |
| 2013/0080975 A1 | 3/2013 | Geithner |

* cited by examiner

*Primary Examiner* — Kyle Stork
(74) *Attorney, Agent, or Firm* — Fish & Richardson P.C.

(57) ABSTRACT

The present disclosure involves computer-implemented methods, software, and systems for browsing hierarchically structured data using a concentric hierarchical list browser. A computer-implemented method includes displaying, using at least one hardware processor, a first-level circular user interface object with at least one first-level user interface object representing a first-level data object. Responsive to receiving an indication of a selection of the at least one first-level user interface object, decreasing the diameter of the first-level circular interface object, and displaying in a second-level circular user interface object at least one second-level user interface object representing a second-level data object associated with the first-level data object, wherein the second-level circular user interface object has an inner circular edge and an outer circular edge, and wherein the inner circular edge of the second-level circular user interface object is attached to the outer circular edge of the first-level circular user interface object.

15 Claims, 9 Drawing Sheets

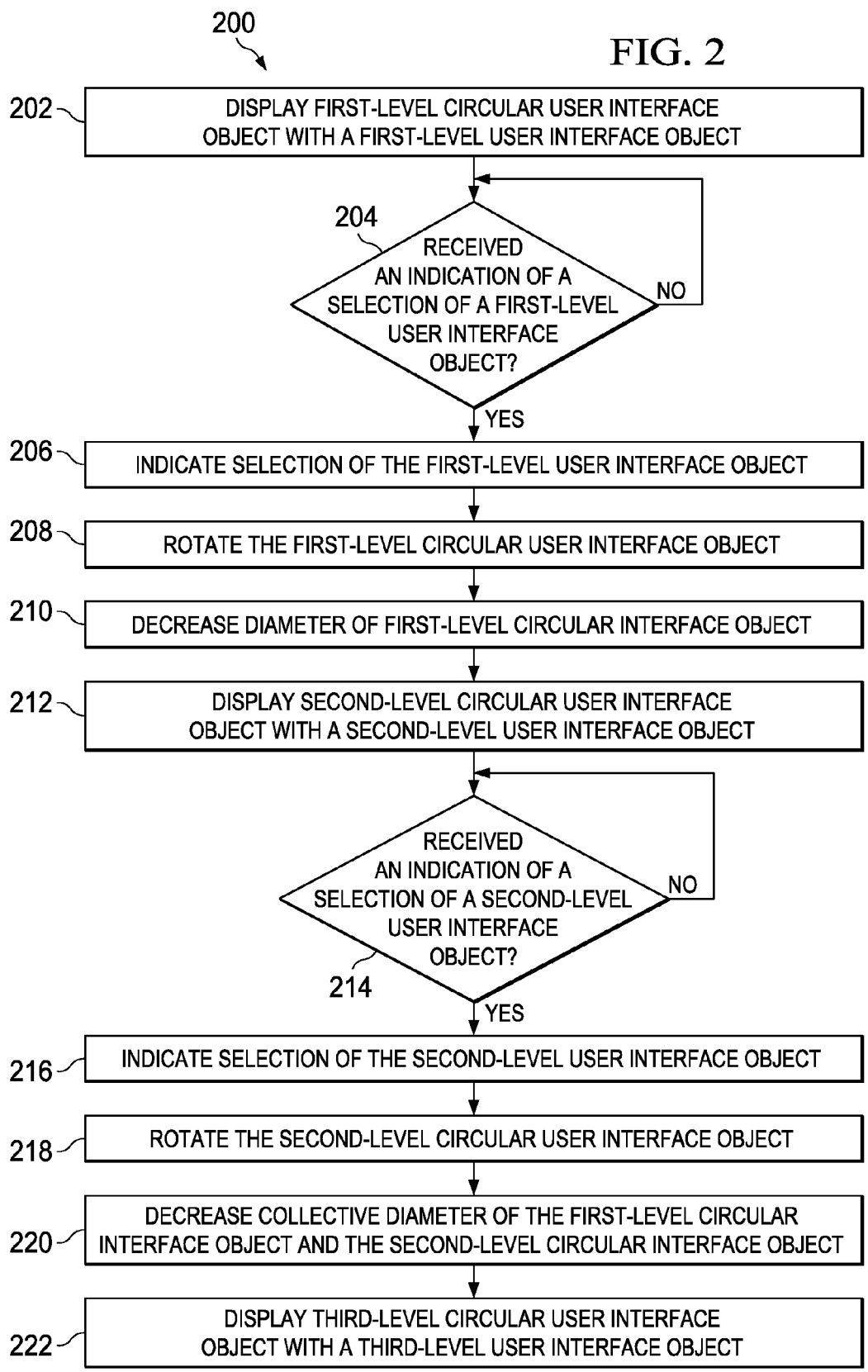

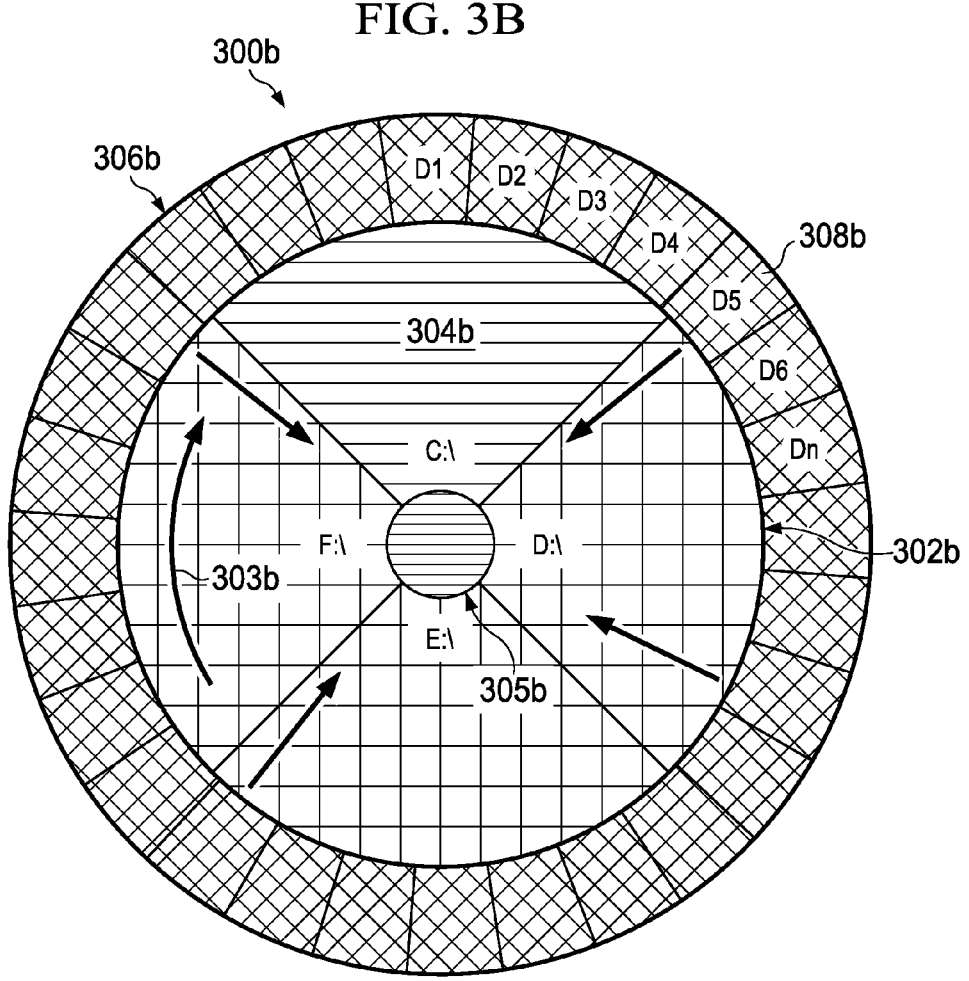

CONCENTRIC HIERARCHICAL LIST BROWSER

CLAIM OF PRIORITY

This application claims priority under 35 USC §119(e) to U.S. patent application Ser. No. 13/243,918 filed on Sep. 23, 2011, and EP Application Serial No. 12184874.1 filed on Sep. 18, 2012, both of which the entire contents are hereby incorporated by reference.

TECHNICAL FIELD

The present disclosure relates to computer-implemented methods, software, and systems for browsing hierarchically structured data using a concentric hierarchical list browser.

BACKGROUND

Browsing of hierarchically structured data on a computer system is currently realized through the use of tools allowing navigation through nested, hierarchical, tree-like structured lists of data items (e.g., storage repositories, network drives, folders, and/or files). The structure of current browsing tools requires increased vertical and/or horizontal scrolling motions as the number of the data items increase in the hierarchically structured data. Browsing for specific data items using current browsing tools is especially problematic on devices with limited display size, such as smart phones, PDAs, and mobile computers. Increased numbers of scrolling motions are also wasteful of time, repetitive, and cumbersome. Furthermore, the length of tree-like structured lists displayed by browsing tools often exceeds the dimensions of a physical display and, without scrolling, limits a user to a data view limited to the size of the physical display.

SUMMARY

The present disclosure provides for a computer-implemented method, computer-accessible storage medium, and a computer system in the independent claims; implementations are given in the independent claims.

The present disclosure relates to computer-implemented methods, software, and systems for browsing hierarchically structured data using a concentric hierarchical list browser. One computer-implemented method includes displaying, using at least one hardware processor, at least one first-level user interface object representing a first-level data object in a first-level circular user interface object, wherein the first-level circular user interface object has an outer circular edge and is of an initial size. Responsive to receiving an indication of a selection of the at least one first-level user interface object, indicating the selection of the at least one first-level user interface object; decreasing the diameter of the first-level circular interface object or component, and displaying at least one second-level user interface object representing a second-level data object associated with the first-level data object in a second-level circular user interface object, wherein the second-level circular user interface object has an inner circular edge and an outer circular edge, and wherein the inner circular edge of the second-level circular user interface object is attached to the outer circular edge of the first-level circular user interface object.

As will be appreciated by one skilled in the art, aspects of the present disclosure may be embodied as an apparatus, method or computer program product. Accordingly, aspects of the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present disclosure may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some implementations, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present disclosure. Computer executable code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to implementations of the disclosure. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A user interface object as used herein may alternatively be referred to as a selector object. For example a first-level user interface object may be referred to as a first-level selector object. A second-level user interface object may be referred to as a second-level selector object. A third-level user interface object may be referred to as a third-level selector object.

In one aspect the disclosure provides for a computer-implemented method for browsing hierarchically structured data. The method comprises displaying, using at least one hardware processor, a first-level circular user interface object with at least one first-level user interface object representing a first-level data object. The first-level circular user interface object has an outer circular edge and is of an initial size. The method further comprises responsive to receiving an indication of a selection of the at least one first-level user interface object: indicating the selection of the at least one first-level user interface object, decreasing the diameter of the first-level circular interface component, displaying in a second-level circular user interface object at least one second-level user interface object representing a second-level data object associated with the first-level data object. The second-level circular user interface object has an inner circular edge and an outer circular edge. The inner circular edge of the second-level circular user interface object is attached to the outer circular edge of the first-level circular user interface object.

In another implementation the method further comprises responsive to receiving an indication of a selection of the at least one second-level user interface object: indicating selection of the at least one second-level user interface object; decreasing the collective diameter of the first-level circular user interface object and the second-level circular user interface object; and displaying in a third-level circular user interface object at least one third-level user interface object representing a third-level data object associated with the second-level data object. The third-level circular user interface object has an inner circular edge and an outer circular edge. The inner circular edge of the third-level circular user interface object is attached to the outer circular edge of the second-level circular user interface object.

In another implementation selecting is performed using at least one of a computer mouse, keyboard, stylus, touch screen, an algorithm, and voice recognition.

In another implementation the method further comprises resizing the collective diameter of the first-level circular user interface object and the second-level circular user interface object.

In another implementation the resizing is performed by at least one of selecting, clicking, multi-clicking, dragging, multi-touch, pinching, an algorithm, and voice control.

In another implementation the method further comprises displaying, in the first-level circular user interface object, a fourth user interface object.

In another implementation the fourth user interface object performs an undo function when selected.

In another implementation each of the first-level circular user interface object, the second-level circular user interface object, and the third-level circular user interface object may be rotated independently.

In another implementation the collective diameter of the first-level circular user interface object and the second-level circular user interface object equals the initial size.

In another implementation the collective diameter of the first-level circular user interface object, the second-level circular user interface object, and third-level circular user interface object equals the initial size.

In another aspect the disclosure provides for a computer-program product for browsing hierarchically structured data. The computer program product comprises computer-readable instructions embodied or stored on tangible, non-transitory media, the instructions operable when executed to display, using at least one hardware processor, a first-level circular user interface object with at least one first-level user interface object representing a first-level data object. The first-level circular user interface object has an outer circular edge and is of an initial size. The instructions are further operable to, when executed by the at least one hardware processor, be responsive to receiving an indication of a selection of the at least one first-level user interface object: indicate the selection of the at least one first-level user interface object; decrease the diameter of the first-level circular interface component; and display in a second-level circular user interface object at least one second-level user interface object representing a second-level data object associated with the first-level data object. The second-level circular user interface object has an inner circular edge and an outer circular edge. The inner circular edge of the second-level circular user interface object is attached to the outer circular edge of the first-level circular user interface object.

In another implementation the instructions are operable to be further responsive to receiving an indication of a selection of the at least one second-level user interface object. The instructions are further operable to indicate the selection of the at least one second-level user interface object. The instructions are further operable to decrease the collective diameter of the first-level circular user interface object and the second-level circular user interface object. The instructions are further operable to display in a third-level circular user interface object at least one third-level user interface object representing a third-level data object associated with the second-level data object. The third-level circular user interface object has an inner circular edge and an outer circular edge. The inner circular edge of the third-level circular user interface object is attached to the outer circular edge of the second-level circular user interface object.

In another implementation the instructions further operable when executed to resize the collective diameter of the first-level circular user interface object and the second-level circular user interface object.

In another implementation each of the first-level circular user interface object, the second-level circular user interface object, and the third-level circular user interface object may be rotated independently.

In another implementation the collective diameter of the first-level circular user interface object and the second-level circular user interface object equals the initial size.

In another implementation the collective diameter of the first-level circular user interface object, the second-level circular user interface object, and third-level circular user interface object equals the initial size.

In another aspect the disclosure provides for a system for browsing hierarchically structured data. The system comprises memory operable to store at least one file system. The system further comprises at least one hardware processor coupled to the memory and operable to display a first-level circular user interface object with at least one first-level user interface object representing a first-level data object. The first-level circular user interface object has an outer circular edge and is of an initial size. The at least one hardware processor is further operable to, responsive to receiving an indication of a selection of the at least one first-level user interface object: indicate the selection of the at least one first-level user interface object; decrease the diameter of the first-level circular interface component; and display in a second-level circular user interface object at least one second-level user interface object representing a second-level data object associated with the first-level data object. The second-level circular user interface object has an inner circular edge and an outer circular edge. The inner circular edge of the second-level circular user interface object is attached to the outer circular edge of the first-level circular user interface object.

In another implementation the instructions and hardware processor are further operable to, responsive to receiving an indication of a selection of the at least one second-level user interface object: indicate the selection of the at least one second-level user interface object; decrease the collective diameter of the first-level circular user interface object and the second-level circular user interface object; and display in a third-level circular user interface object at least one third-level user interface object representing a third-level data object associated with the second-level data object. The third-level circular user interface object has an inner circular edge and an outer circular edge. The inner circular edge of the third-level circular user interface object is attached to the outer circular edge of the second-level circular user interface object.

In another implementation the instructions further operable, when executed by the hardware processor, to resize the collective diameter of the first-level circular user interface object and the second-level circular user interface object.

In another implementation the collective diameter of the first-level circular user interface object and the second-level circular user interface object equals the initial size.

In one aspect the disclosure provides for a computer-implemented method for browsing hierarchically structured data. The method comprises displaying on a display a first level circular user interfaced object with at least one first-level selector object. The first-level selector objects may each representing a first-level data object. The first-level circular user interface object may be part of a graphical user interface. The first-level data objects may have their first-level selector objects arranged around the circular display. The first-level data objects may represent the first level in the hierarchy of the hierarchically structured data. The first-level circular user interface object has an outer circular edge and is of an initial diameter. The method further comprises in response to receiving a first selection one of the at least one first-level selector objects indicating the first selection on the display, decreasing the diameter of the first level circular interface component, and displaying a second-level circular user interface object with at least one second-level selector object.

The second-level selector objects may each represent a second-level data object associated with the first selection. The second-level circular user interface object has an inner circular edge and an outer circular edge. The inner circular edge of the second-level circular user interface object is attached to the outer circular edge of the first-level circular user interface object. In other words the second-level circular user interface object is placed around the first-level circular user interface object.

Arranging the selector objects in a circular fashion may have the advantage of providing a more efficient user interface. For instance when an operator is using the graphical user interface that is arranged circularly the subject can search through each of the items sequentially. If the user did not find the particular first-level selector object or second-level selector object or other level selector object then the operator can continue to search in a circular fashion. This may be easier for the subject to locate the object because he or she does not need to go back to the beginning of the list again. The operator can just simply continue to search. This may therefore reduce the cognitive burden of someone browsing a hierarchically structured data.

There may be different ways of indicating the selection of the first-level selector object. For instance the selector may be highlighted in a display, made larger, or the entire circular user interface object may rotate so that the selected first-level selector object is rotated into a particular position to indicate its selection. The same may apply for second-level circular user interface objects and higher-level circular user interface objects.

In another implementation the outer circular edge of the second-level circular user interface has a diameter less than or equal to the initial diameter.

In another implementation the outer circular edge of the second-level circular interface object equals the initial diameter. For instance when the particular first level selector object is selected the first-level circular user interface object may shrink in diameter and then the second-level circular user interface object is placed around it. This may be extremely beneficial when there is limited screen size. For instance in a mobile telephone device or a mobile computing device there is typically very limited screen space. This implementation may have the advantage of providing an interface which uses a fixed amount of space despite the amount of information which is displayed.

In some implementations the number of selector objects which represent data objects may grow to a large number. This may for instance be fit onto the circular user interface objects more easily by using smaller and smaller selector objects. To display the data accurately when the subject is searching as the mouse, finger or other selector for the user interface goes over a particular selector object it may be enlarged so that the subject is able to see more data or more of a description of the particular selector object.

In another implementation the method further comprises responding to receiving an indication of a second selection of the at least one second-level selector object. The method further comprises indicating the second selection on the display. As mentioned before, this indication may be performed in a variety of ways such as highlighting the second selection or rotating the second level circular user interface object to a particular orientation to indicate the second selection. The method further comprises decreasing the size of the first-level circular user interface object and the second-level circular user interface object in response to receiving the second selection. The method further comprises displaying a third-level circular user interface object with at least one third-level selector object. The third-level selector objects may each represent a third-level data object associated with the second selection. The third-level circular user interface object has an inner circular edge and an outer circular edge. The inner circular edge of the third-level circular user interface object is attracted to the outer circular edge of the second-level circular user interface object. This implementation may also apply to higher-level circular interface objects since after the particular third-level circular user interface object is displayed there may be fourth, fifth, or even higher-levels which may be selected in turn.

In another implementation the outer circular edge of the third-level circular user interface has a diameter less than or equal to the initial diameter.

In another implementation the outer circular edge of the third-level circular user interface object equals the initial diameter. This implementation is beneficial because it limits the size of the overall graphical user interface. As mentioned previously this may be particularly beneficial in mobile telephone or mobile computing devices where the screen or display size is limited.

In another implementation the collective diameter of the first-level circular user interface object, the second-level circular user interface object, and the third-level circular user interface object equals the initial size.

In another implementation the hierarchically structured data has a tree like structure with m-levels, where m is the number of levels in the hierarchy. m is greater than or equal to 2. The method further comprises receiving a nth selection of one of the at least one n-level selector object. n is less than m. The method further comprises indicating the first selection on the display in response to receiving the nth selection. The method further comprises decreasing a nth outer diameter of an n-level circular interface object in response to receiving the nth-selection. The method further comprises displaying an n+1-level circular user interface object with at least one n+1-level selector object in response to the nth selection. The n+1-level circular user interface object is a n+1 graphical user interface object with a n+1 circular form. The n+1-level circular user interface is operable for receiving a n+1 selection of one of the at least one n+1-level selector objects. The at least one n+1-level data object represents a n+1-level branch of an n+1 level of the hierarchically structured data. The n+1 branch is determined by the nth selection. The n+1-level circular user interface object has an inner circular edge and an outer circular edge. The inner circular edge of the n+1-level circular user interface object is attached to the outer circular edge of the n-level circular user interface object. This implementation encompasses the idea that all levels of a m-level hierarchy may be traversed or browsed using the method.

In another implementation the method further comprises in response to receiving a selection of one of the at least one second-level user interface objects indicating the selection on the display and displaying on the display a rectangular user interface object at least partially outside of the circular edge. This implementation may be beneficial because it may be used to display a more detailed information on the item that was selected or provide a more detailed view. For instance the contents of a particular directory may be displayed, the contents of a file, or Meta data may be displayed. This implementation may also apply to higher-level user interface objects. It is understood that it is not limited to simply the second-level user interface objects.

In another implementation the method further comprises resizing the collective diameter of the first-level circular user interface object and the second-level circular user interface object. The resizing is performed by at least one of selecting, clicking, multi-clicking, dragging, multi-touch, pinching, through an algorithm, and through voice control.

In another implementation the method further comprises displaying in the first-level circular user interface object, a fourth user interface object.

In another implementation the fourth user interface object performs an undo function when selected. For instance the fourth user interface object may be a central region of the circular graphical user interface. A variety of functions may be triggered by this region, for instance but not limited to: an undo function, functions for moving up and down the hierarchy of the data, and returning home to the original first-level circular user interface object without displaying any higher-level circular user interface objects.

In another implementation the hierarchical structured data represents internal machine states. For instance the hierarchical structured data may represent files in a machine's memory or in a storage location. In other implementations the internal machine states may also represent particular storage locations or data registers used by the processor.

In another implementation each of the at least one first-level selector objects is displayed as a portion of the first-level circular user interface object. This implementation also applies to second-level, third-level, fourth-level, and higher-level circular user interface objects also.

In another implementation each of the first-level selector objects represents data selected from the hierarchical structured data. This implementation also applies to second-level, third-level, fourth-level, and higher-level selector objects.

In another implementation the method further comprises displaying on the display a first-level icon within the boundary of the outer circular edge during receiving the selection of at least one first-level selector object. For instance if the first-level selector object is displayed on a touch screen as the operator runs his or her finger over the various selector objects various icons may be displayed. This may assist the operator in choosing the proper selection because it is cognitively less challenging if an easily recognized icon is displayed.

In another aspect the disclosure provides for a computer-program comprising computer-readable instructions. The instructions cause a processor to display on a display a first-level circular user interface object with at least one first-level selector object. The first-level circular user interface object is a first graphical user interface object with a first circular form. The at least one first-level data object represents a first level of hierarchically structured data. The first-level circular user interface object has an outer circular edge with a first diameter. The first diameter is equal to an initial diameter. The instructions further cause the processor to receive a first selection of one of the at least one first-level selector object. The instructions further cause the processor to indicate (206) the first selection on the display in response to receiving the selection. The instructions further cause the processor to decrease the first diameter in response to receiving the selection. The instructions further cause the processor to display a second-level circular user interface object with at least one second-level selector object in response to the first selection. The second-level circular user interface object is a second graphical user interface object with a second circular form. The second-level circular user interface is operable for receiving a second selection of one of the at least one-second level selector objects. The at least one second-level data object represents a second-level branch of a second level of the hierarchically structured data. The first branch is determined by the first selection. The second-level circular user interface object has an inner circular edge and an outer circular edge. The inner circular edge of the second-level circular user interface object is attached to the outer circular edge of the first-level circular user interface object.

In another aspect the disclosure provides for a computer system comprising a memory for storing machine executable instructions and a processor operable for executing the machine executable instructions. Execution of the instructions cause the processor to display on a display a first-level circular user interface object with at least one first-level selector object. The first-level circular user interface object is a first graphical user interface object with a first circular form. The at least one first-level data object represents a first level of the hierarchically structured data. The first-level circular user interface object has an outer circular edge with a first diameter, wherein first diameter equal to an initial diameter.

Execution of the instructions further cause the processor to receive a first selection of one of the at least one first-level selector object. Execution of the instructions further cause the processor to indicate the first selection on the display in response to receiving the selection. Execution of the instructions further cause the processor to decrease the first diameter in response to receiving the selection. Execution of the instructions further cause the processor to display a second-level circular user interface object with at least one second-level selector object in response to the first selection. The second-level circular user interface object is a second graphical user interface object with a second circular form. The second-level circular user interface is operable for receiving a second selection of one of the at least one-second level selector objects. The at least one second-level data object represents a second-level branch of a second level of the hierarchically structured data. The first branch is determined by the first selection, wherein the second-level circular user interface object has an inner circular edge and an outer circular edge. The inner circular edge of the second-level circular user interface object is attached to the outer circular edge of the first-level circular user interface object.

The computing device may for instance be, but is not limited to: a smart phone or a tablet computer, or a personal digital assistant.

It is understood that one or more claims and/or one or more of the implementations of the disclosure may be combined as long as the combined elements are not mutually exclusive.

While generally described as computer-implemented software embodied on a non-transitory computer readable storage device that processes and transforms respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DESCRIPTION OF DRAWINGS

In the following, implementations of the disclosure are explained in greater detail, by way of example only, making reference to the drawings in which:

FIG. 2 is flowchart of an example method for browsing hierarchically structured data using a concentric hierarchical list browser.

FIGS. 3A-3C illustrate example implementations of a concentric hierarchical list browser.

DETAILED DESCRIPTION

This disclosure generally describes computer-implemented methods, software, and systems for browsing hierarchically structured data. Specifically described are computer-implemented methods, software, and systems for browsing hierarchically structured data using a concentric hierarchical list browser.

Previously, the browsing of hierarchically structured data objects, (e.g. file systems, categorized/grouped data objects such as music files with classification for music style, publication year, composer, performer, . . . ) was a time-consuming, cumbersome, and repetitive process, especially on devices with limited display size, such as smartphones, PDAs, and mobile computers. The advantages of the present disclosure are numerous. First, browsing tools for hierarchically structured data efficiently present an easily manipulated representation of data objects in the file system within a limited display area. This efficient use of display space optimizes file browsing on devices with limited display area restrictions. Second, repetitive and cumbersome vertical/horizontal scrolling motions are mitigated. Further, data object relationships are presented in a manner that is naturally visually associative. Furthermore, the present disclosure offers numerous advantages for at least hardware devices. For example, the present disclosure describes a method and system allowing a user to efficiently manipulate user interface objects via natural "gestures" (i.e., user/user interface interactions with more than one finger). Gestures may be used to resize data object representations within the concentric hierarchical list browser, turning concentric circles, rings, etc.

Figure 1:
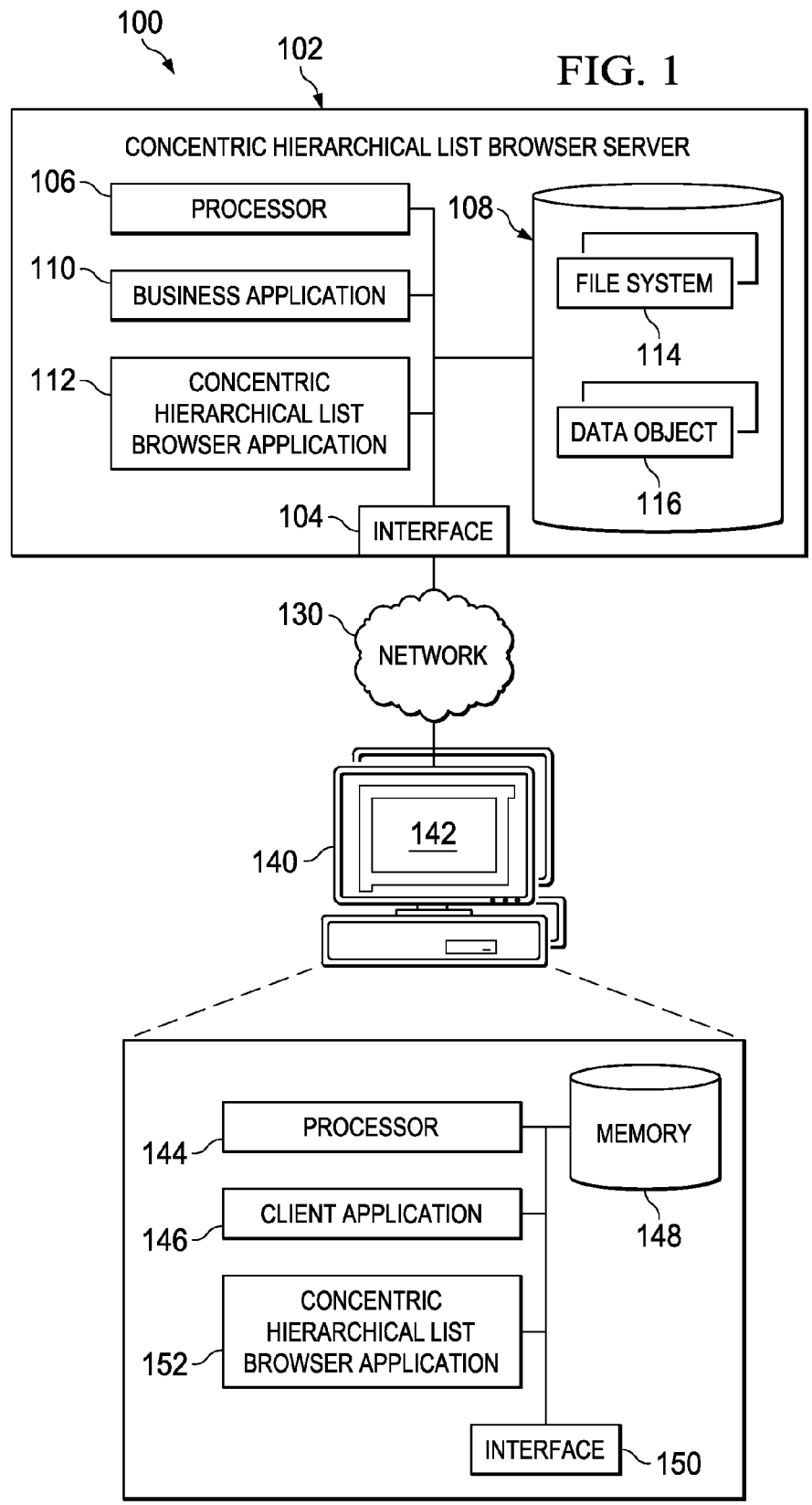
FIG. 1 illustrates an example environment for implementing various features of a system for browsing hierarchically structured data using a concentric hierarchical list browser.

Turning to the figures, FIG. 1 illustrates an example environment 100 for implementing various features of system providing file system browsing in accordance with one implementation of the present disclosure. While the figures are based on the example of an implementation of a concentric hierarchical list browser to visualize hierarchically structured data of a file system, this is for illustrative purposes only and does not limit the general idea to file systems. Generally, the concentric hierarchical list browser can be applied to any type of hierarchically structured data.

The illustrated environment 100 includes, or is communicably coupled with, at least one concentric hierarchical list browser server 102 and at least one client 140. At least one client 140 and the concentric hierarchical list browser server 102 may communicate across or via network 130. In general, example environment 100 depicts an example configuration of a system for providing browsing of hierarchically structured data using a concentric hierarchical list browser. In alternative implementations, the elements illustrated within the concentric hierarchical list browser server 102 and/or the client 140 may be included in or associated with different and/or additional servers, clients, networks, or locations other than those illustrated in FIG. 1. Additionally, the functionality associated with the concentric hierarchical list browser server 102 may be associated with any suitable system, including by adding additional instructions, programs, applications, or other software to existing systems. For example, the components illustrated within the concentric hierarchical list browser server 102 may be included in multiple servers, cloud-based networks, or other locations accessible to the concentric hierarchical list browser server 102 (e.g., either directly or via network 130).

In general, the concentric hierarchical list browser server 102 is any server that provides browsing of a physical or virtual file system using a concentric hierarchical list browser via the concentric hierarchical list browser application 112, where the concentric hierarchical list browser application 112 is associated with at least one file system 114 instance.

For example, each concentric hierarchical list browser server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some implementations, other non-Java based servers and or systems could be used for the concentric hierarchical list browser server 102. In some implementations, each concentric hierarchical list browser server 102 can store and execute a plurality of various other applications (not shown), while in other implementations, each concentric hierarchical list browser server 102 may be a dedicated server meant to store and execute a particular concentric hierarchical list browser application 112 and its related functionality. In some implementations, the concentric hierarchical list browser server 102 can comprise a web server or be communicably coupled with a web server, where the particular concentric hierarchical list browser application 112 associated with that concentric hierarchical list browser server 102 represents a web-based (or web-accessible) application accessed and executed on an associated at least one client 140 to perform the programmed tasks or operations of the corresponding concentric hierarchical list browser application 112, as well as to provide user interactions with a business process. In still other instances, the concentric hierarchical list browser application 112 may be executed on a first system, while the file system and data the concentric hierarchical list browser application 112 manipulates and provides information on may be located at a remote, second system. In the illustrated example, the concentric hierarchical list browser application 112 and the file system are co-located on the concentric hierarchical list browser server 102.

At a high level, the concentric hierarchical list browser server 102 comprises an electronic computing device operable to receive, transmit, process, store, or manage data and information associated with the example environment 100. The concentric hierarchical list browser server 102 illustrated in FIG. 1 can be responsible for receiving application requests from at least one client 140 (as well as any other entity or system interacting with the concentric hierarchical list browser server 102), responding to the received requests by processing said requests in an associated concentric hierarchical list browser application 112, and sending the appropriate responses from the concentric hierarchical list browser application 112 back to the requesting client 140 or other requesting system. The concentric hierarchical list browser application 112 can also process and respond to local requests from a user locally accessing the associated concentric hierarchical list browser server 102. Accordingly, in addition to requests from the external clients 140 illustrated in FIG. 1, requests associated with a particular concentric hierarchical list browser application 112 may also be sent from internal users, external or third-party customers, and other associated business applications, as well as any other appropriate entities, individuals, systems, or computers. In some implementations, the concentric hierarchical list browser application 112 can be a web-based application executing functionality associated with the networked or cloud-based business process.

As used in the present disclosure, the term "computer" is intended to encompass any suitable processing device. For example, although FIG. 1 illustrates a single concentric hierarchical list browser server 102, example environment 100 can be implemented using any number of servers, as well as computers other than servers, including a server pool. Indeed, the concentric hierarchical list browser server 102 may be any computer or processing device such as, for example, a blade server, general-purpose personal computer (PC), Macintosh, workstation, UNIX-based workstation, tablet computer, or any other suitable device. In other words, the present disclosure contemplates computers other than general purpose computers, as well as computers without conventional operating systems. Further, the illustrated concentric hierarchical list browser server 102 may be adapted to execute any physical or virtual operating system, including Linux, UNIX, Windows, Mac OS, WebOS, iOS, Android, or any other suitable operating system.

In the illustrated implementation of FIG. 1, the concentric hierarchical list browser server 102 includes an interface 104, a processor 106, a memory 108, at least one business application 110, and at least one concentric hierarchical list browser application 112. While illustrated as a single component in the example environment 100 of FIG. 1, alternative implementations may illustrate the concentric hierarchical list browser server 102 as comprising multiple parts or portions accordingly.

The interface 104 is used by the concentric hierarchical list browser server 102 to communicate with other systems in a client-server or other distributed environment (including within example environment 100) connected to the network 130 (e.g., an associated client 140, as well as other systems communicably coupled to the network 130). FIG. 1 depicts both a server-client environment, but could also represent a cloud-computing network. Various other implementations of the illustrated example environment 100 can be provided to allow for increased flexibility in the underlying system, including multiple concentric hierarchical list browser servers 102 performing or executing at least one additional or alternative implementations of the concentric hierarchical list browser application 112, as well as other applications associated with or related to the concentric hierarchical list browser application 112. In those implementations, the different concentric hierarchical list browser servers 102 may communicate with each other via a cloud-based network or through the connections provided by network 130. Returning to the illustrated example environment 100, the interface 104 generally comprises logic encoded in software and/or hardware in a suitable combination and operable to communicate with the network 130. More specifically, the interface 104 may comprise software supporting at least one communication protocol associated with communications such that the network 130 or the interface's hardware is operable to communicate physical signals within and outside of the illustrated example environment 100.

Generally, the concentric hierarchical list browser server 102 may be communicably coupled with a network 130 that facilitates wireless or wireline communications between the components of the example environment 100 (i.e., between the concentric hierarchical list browser server 102 and at least one client 140), as well as with any other local or remote computer, such as additional clients, servers, or other devices communicably coupled to network 130, including those not illustrated in FIG. 1. In the illustrated example environment 100, the network 130 is depicted as a single network, but may be comprised of more than one network without departing from the scope of this disclosure, so long as at least a portion of the network 130 may facilitate communications between senders and recipients. In some implementations, at least one component associated with the concentric hierarchical list browser server 102 can be included within the network 130 as at least one cloud-based service or operation. The network 130 may be all or a portion of an enterprise or secured network, while in another implementation, at least a portion of the network 130 may represent a connection to the Internet. In some implementations, a portion of the network 130 can be a virtual private network (VPN). Further, all or a portion of the network 130 can comprise either a wireline or wireless link. Example wireless links may include cellular, 802.11a/b/g/n, 802.20, WiMax, and/or any other appropriate wireless link. In other words, the network 130 encompasses any internal or external network, networks, sub-network, or combination thereof operable to facilitate communications between various computing components inside and outside the illustrated example environment 100. The network 130 may communicate, for example, Internet Protocol (IP) packets, Frame Relay frames, Asynchronous Transfer Mode (ATM) cells, voice, video, data, and other suitable information between network addresses. The network 130 may also include at least one local area network (LAN), radio access network (RAN), metropolitan area network (MAN), wide area network (WAN), all or a portion of the Internet, and/or any other communication system or systems in at least one location. The network 130, however, is not a required component in some implementations of the present disclosure.

As illustrated in FIG. 1, the concentric hierarchical list browser server 102 includes a processor 106. Although illustrated as a single processor 106 in the business process server 102, two or more processors may be used in the concentric hierarchical list browser server 102 according to particular needs, desires, or particular implementations of example environment 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the concentric hierarchical list browser server 102 and, specifically, the functionality associated with the corresponding concentric hierarchical list browser application 112. In one implementation, the concentric hierarchical list browser server 102 processor 106 executes the functionality required to receive and respond to requests and instructions from the at least one client 140, as well as the functionality required to perform the operations of the associated business application 110 and concentric hierarchical list browser application 112.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, C#, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated example environment 100, each processor 106 executes the concentric hierarchical list browser application 112 stored on the associated concentric hierarchical list browser server 102. In some implementations, a particular concentric hierarchical list browser server 102 can be associated with the execution of two or more concentric hierarchical list browser applications 112, as well as at least one distributed application executing across two or more concentric hierarchical list browser servers 102.

At least one business application 110 is illustrated within the concentric hierarchical list browser server 102. The business application 110 can be any application, program, module, process, or other software that may execute, change, delete, generate, or otherwise manage information associated with a particular concentric hierarchical list browser server 102, and in some cases, a business process performing and executing business process-related events. In particular, business processes communicate with other users, applications, systems, and components to send and receive events. In some implementations, a particular business application 110 can operate in response to and in connection with at least one request received from an associated client 140. Additionally, a particular business application 110 may operate in response to and in connection with at least one request received from other business applications 110, including a business application 110 associated with another concentric hierarchical list browser server 102. In some implementations, each business application 110 can represent a web-based application accessed and executed by remote clients 130 via the network 130 (e.g., through the Internet, or via at least one cloud-based service associated with the concentric hierarchical list browser application 112). For example, a portion of a particular business application 110 may be a web service associated with the business application 110 that is remotely called, while another portion of the business application 110 may be an interface object or agent bundled for processing at a remote client 140. Moreover, any or all of a particular business application 110 may be a child or sub-module of another software module or enterprise application (not illustrated) without departing from the scope of this disclosure. Still further, portions of the particular business application 110 may be executed or accessed by a user working directly at the concentric hierarchical list browser server 102, as well as remotely at a corresponding client 140. In some implementations, the concentric hierarchical list browser server 102 can execute the business process models using the at least one business application 110.

At least one concentric hierarchical list browser application 112 is illustrated within the concentric hierarchical list browser server 102. Each concentric hierarchical list browser application 112 is any application, program, module, process, or other suitable software that may execute, change, delete, generate, or otherwise manage information associated with a particular concentric hierarchical list browser server 102, and in some cases, a business process performing and executing business process-related events. For purposes of this application, "circular" may mean generally round in shape and may include circles, rings, spheres, ovals, etc.

The concentric hierarchical list browser application 112 may display the file system's hierarchy and/or content of the file system hierarchy via a circular file browser user interface. The circular file browser user interface may have multiple associated concentric levels which may be nested. Each concentric level may display data objects associated with the particular level in the file system. In some implementations, deeper levels of the file system are displayed in the outer layers of the circular file browser user interface. In some implementations, the circular file browser user interface may display in two or more dimensions. In some implementations, a particular concentric hierarchical list browser application 112 can operate in response to and in connection with at least one request received from an associated client 140. In some implementations, a particular concentric hierarchical list browser application 112 can operate in response to and in connection with at least one request received from at least one business application 110. Additionally, a particular concentric hierarchical list browser application 112 may operate in response to and in connection with at least one request received from other concentric hierarchical list browser applications 112, including a concentric hierarchical list browser application 112 associated with another concentric hierarchical list browser server 102. Each concentric hierarchical list browser application 112 may be on the same system as the business application 110 or on a different, communicably coupled system. In some implementations, a concentric hierarchical list browser application 112 can be included or embedded within a particular business application 110, or, alternatively, a portion of the particular business application's inherent functionality. In some instances, at least a portion of the concentric hierarchical list browser application's 112 functionality can also be included within the operating system of the concentric hierarchical list browser server 102, such as a system explorer or other directory browsing/access tool. In some implementations, each concentric hierarchical list browser application 112 can represent a web-based application accessed and executed by remote clients 130 via the network 130 (e.g., through the Internet, or via at least one cloud-based service associated with the concentric hierarchical list browser application 112). In some implementations, the concentric hierarchical list browser application 112 can manage the display and/or operation of a concentric file browser user interface associated with the concentric hierarchical list browser server 102, an associated client 140, and/or another concentric hierarchical list browser server 102. Further, while illustrated as internal to the concentric hierarchical list browser server 102, at least one file system 114 and/or data object 116 associated with a particular concentric hierarchical list browser application 112 may be stored or referenced remotely. For example, a portion of a particular concentric hierarchical list browser application 112 may be a web service associated with the concentric hierarchical list browser application 112 that is remotely called, while another portion of the concentric hierarchical list browser application 112 may be an interface object or agent bundled for processing at a remote client 140. Moreover, any or all of a particular concentric hierarchical list browser application 112 may be a child or sub-module of another software module or enterprise application (not illustrated) without departing from the scope of this disclosure. Still further, portions of the particular concentric hierarchical list browser application 112 may be executed or accessed by a user working directly at the concentric hierarchical list browser server 102, as well as remotely at a corresponding client 140. In some implementations, the concentric hierarchical list browser server 102 can allow browsing of a local and/or remote file system and/or associated data objects 116 using the at least one concentric hierarchical list browser application 112.

The concentric hierarchical list browser server 102 also includes a memory 108 for storing data and program instructions. The memory 108 may include any memory or database module and may take the form of volatile or non-volatile memory including, without limitation, magnetic media, optical media, random access memory (RAM), read-only memory (ROM), flash memory, removable media, or any other suitable local or remote memory component. The memory 108 may store various objects or data, including classes, frameworks, applications, backup data, business objects, jobs, web pages, web page templates, database tables, process contexts, repositories storing services local to the concentric hierarchical list browser server 102, and any other appropriate information including any parameters, variables, algorithms, instructions, rules, constraints, or references thereto associated with the purposes of the concentric hierarchical list browser server 102 and its concentric hierarchical list browser application 112. In some implementations, including a cloud-based system, some or all of the memory 108 can be stored remote from the concentric hierarchical list browser server 102, and communicably coupled to the concentric hierarchical list browser server 102 for usage. As illustrated in FIG. 1, memory 108 includes at least one file system 114 and at least one data object 116.

The at least one file system 114 may represent a physical or virtual file system and may be a disk, optical, flash, tape, database, transactional, network, shared disk, device specific, FAT, NTFS, HFS Plus, UFS, Ext, Flat-file, or another suitable file system. The at least one file system 114 may execute under any physical or virtual operating system, including Linux, UNIX, Solaris, Windows, Mac OS, WebOS, iOS, Android, or any other suitable operating system. In some implementations, the file system can be hierarchical and/or weighted. In some implementations, the file system can be remote to the concentric hierarchical list browser server 102. The file system may be accessed via a web service, a remote access system or software, a local or remote client 140, etc.

The at least one data object 116 may be a file, file name, pointer, reference, directory/folder, drive, network drive, metadata, business object, image, video, audio, multimedia, a placeholder, or any other suitable data object. The at least one data object could also be an attribute of a data object in computer memory. For example, the attribute could be information encapsulated in a music file such as composer, publication year, music style, artist, or the like. The at least one data object may reside on or be referenced by an above-mentioned at least one file system 114 or other suitable file system. The data object may reside locally and/or remotely to the at least one file system 114.

In general, a client 140 is any computer device operable to connect or communicate with concentric hierarchical list browser server 102 using a wireless or wireline connection (i.e., network 130). In particular, the client 140 may be embodied as a mobile or non-mobile computing device. At a high level, each client 140 can include a processor 144, a GUI 142, a client application 146, a memory 148, an interface 150, and a concentric hierarchical list browser application 152. In general, the client 140 comprises an electronic computer device operable to receive, transmit, process, and/or store any appropriate data associated with a concentric hierarchical list browser server 102 or other suitable data source.

The interface 150 of the client 140 may be similar to the interface 104 of the concentric hierarchical list browser server 102, in that it may comprise logic encoded in software and/or hardware in a suitable combination and operable to communicate with the network 130. More specifically, interface 140 may comprise software supporting at least one communication protocol such that the network 130 or hardware is operable to communicate physical signals to and from the client 140. Further, although illustrated as a single interface 140, the interface 140 may be implemented as multiple interfaces in the client 140.

Similarly, memory 148 of the client 140 may include any memory or database module and may take the form of volatile or non-volatile memory including, without limitation, magnetic media, optical media, random access memory (RAM), read-only memory (ROM), removable media, or any other suitable local or remote memory component. For example, memory 148 may store a client application 146, a concentric hierarchical list browser application 152, backup data, parameters, cookies, variables, algorithms, instruction, rules, or reference thereto. As illustrated, memory 148 can include any suitable components to interpret and decode messages received at the client 140. Further, although illustrated as a single memory 148, the memory 148 may be implemented as multiple memories in the client 140. The memory 148 may also store at least one file system (not shown) and an at least one data object (not shown) similar to the at least one file system 114 and the at least one data object 116, respectively stored in memory 108.

In some implementations, processor 144 can be similar to processor 106. In other implementations, the processor 144 may be a processor designed specifically for use in client 140. Further, although illustrated as a single processor 144, the processor 144 may be implemented as multiple processors in the client 140. Regardless of the type and number, the processor 144 executes instructions and manipulates data to perform the operations of the client 140, including operations to receive and process information from the concentric hierarchical list browser server 102 or other suitable data source, access data within memory 148, execute the client application 146, execute the concentric hierarchical list browser 152, as well as perform other operations associated with the client 140.

The client application 146 of the client 140 may retrieve application-related information from a corresponding concentric hierarchical list browser server 102, or the client application may access a local cached set of client-application-related information (not shown) stored on the client 140. In some implementations, the client application 146 can be a web browser. In some implementations, the client-application 146 can use parameters, metadata, and other information received at launch to access a particular set of data from the concentric hierarchical list browser server 102. Once a particular client application 146 is launched, a user may interactively process a task, event, or other information associated with the concentric hierarchical list browser server 102. Further, although illustrated as a single client application 146, the client application 146 may be implemented as multiple client applications in the client 140.

The concentric hierarchical list browser application 152 of the client 140 may be similar to concentric hierarchical list browser application 112 as described above. In some implementations, the concentric hierarchical list browser application 152 can manage the display and operation of a concentric file browser user interface associated with the client 140, another client 140, or an associated concentric hierarchical list browser server 102. In some implementations, the concentric hierarchical list browser application 152 can allow browsing of a local and/or remote file system and/or associated data objects 116. In some implementations, the concentric hierarchical list browser application 152 can manage the display and/or operation of a concentric file browser user interface associated with the client 104, another client 140, and/or an associated concentric hierarchical list browser server 102. The concentric hierarchical list browser application 152 may display the file system's hierarchy and/or content of the file system hierarchy via the concentric file browser user interface. Each concentric level may display data objects associated with the particular level in the file system. In some implementations, deeper levels of the file system can be displayed in the outer layers of the concentric file browser user interface. In some implementations, a concentric hierarchical list browser application 152 can be included or embedded within a particular client application 146, or, alternatively, a portion of the particular client application's inherent functionality. In some instances, at least a portion of the concentric hierarchical list browser application's 146 functionality can also be included within the operating system of the client 140, such as a system explorer or other directory browsing/access tool.

The GUI 142 of the client 140 is a graphical user interface operable to allow the user of the client 140 to interface with at least a portion of the system 100 for any suitable purpose, including to allow a user of the client 140 to interact with at least one of the client applications 146, at least one concentric hierarchical list browser application 152, and with the concentric hierarchical list browser server 102. The term "Graphical User Interface", or GUI, may be used in the singular or plural to describe at least one graphical user interface and each of the displays of a particular graphical user interface. Therefore, the GUI 142 can be any graphical user interface, such as a generic web browser, touch screen, or command line interface (CLI) that processes information in the system 100 and efficiently presents the results to a user. Generally the GUI 142 provides the client 140 with an efficient and user-friendly presentation of data provided by or communication within the system 100. In particular, the GUI 142 may provide users of the client 140 with visualized representation of the client application 146, concentric filed system browser application 152, and other client 140 functionality. The GUI 142 may include a plurality of user interface elements such as interactive fields, pull-down lists, buttons, and other suitable user interface elements operable at the client 140.

While FIG. 1 is described as containing or being associated with a plurality of components, not all components illustrated within the illustrated implementation of FIG. 1 may be utilized in each implementation of the present disclosure. Additionally, at least one component described herein may be located external to example environment 100, while in other implementations, certain components may be included within or as a portion of at least one described component, as well as other components not described. Further, certain components illustrated in FIG. 1 may be combined with other components, as well as used for alternative or additional purposes, in addition to those purposes described herein.

FIG. 2 illustrates a flowchart of an example method 200 for browsing hierarchically structured data using a concentric hierarchical list browser. For clarity of presentation, the description that follows generally describes method 200 in the context of example environment 100 illustrated in FIG. 1, FIGS. 3A-3C, and FIG. 4 However, it will be understood that method 200 may be performed, for example, by any other suitable system, environment, or combination of systems and environments, as appropriate.

Referring now to FIG. 2, method 200 begins at 202. At 202, a first-level circular user interface object with a first-level user interface object is displayed. In some implementations, the first-level circular user interface object can be divided into at least one region where associated first-level user interface objects are displayed. In some implementations, the first-level user interface object represents a first-level business object. In some implementations, a first-level user interface object can represent two or more first-level business objects. In some implementations, the first-level user interface object can be a selectable button, label, badge, image, regular or irregularly shaped area, or other suitable user interface object. In some implementations, the first-level user interface object can be a selectable, graphical representation of the first-level data object. The first-level data object may be a file, file name, pointer, reference, directory/folder, drive, network drive, metadata, image, video, audio, multimedia, business object, a placeholder, or any other suitable data object. The first-level circular user interface object may be used to act as a starting point for displaying/browsing any level of hierarchically structured data. The first-level circular user interface object and the first-level user interface object may be displayed differently to indicate their difference, relative importance, relative size of their particular contents, order of access, date of creation, date of modification, security access level necessary to access, relative value, or any other suitable distinguishing characteristic, value and/or attribute. Displaying differently may mean, for example, different colors, sizes, shapes, or any other suitable indicator. From 202, method 200 proceeds to 204.

At 204, a determination is made whether an indication of a selection of a first-level user interface object was received. Selecting may be performed using, for example, a computer mouse, keyboard, stylus, touch screen, an algorithm, voice recognition or other suitable selection method and/or tool. If the first-level user interface object is not determined to be selected (i.e., after a predetermined period of time), method 200 may stay at 204 until a selection is made. In some instances, if no selection is determined, method 200 can return to some other point in the method 200. Responsive to a determination that an indication of a selection of a first-level user interface object was received, method 200 proceeds to 206. At 206, the selection of the first-level user interface object is indicated. In some implementations, the indication can be made through sound, color, text, animation, or other suitable indication. In some implementations, the indication can be persistent. In other implementations, the indication may not be persistent. In some implementations, the selected first-level circular user interface object can rotate automatically to orient the selected first-level user interface object into a predefined orientation. The predefined orientation may be any distinct position on a circular angle. In some implementations, all selected objects are aligned on the same circular angle. From 206, method 200 proceeds to 208.

At 208, the first-level circular user interface object rotates automatically to orient the selected first-level user interface object into a predefined position as described above. In some implementations, rotation can be clockwise, counterclockwise, or instantaneous. In some implementations, any labels associated with the selected first-level user interface object and other associated first-level user interface objects can rotate automatically to remain in an orientation conducive to viewing and reading. From 208, method 200 proceeds to 210.

At 210, a diameter of a first-level circular user interface object is decreased. In some implementations, associated first-level user interface objects can also be decreased in size to fit within the deceased diameter of the first-level circular user interface object. In some implementations, the decrease in size of the associated first-level user interface objects can be proportional to the decrease in size of the diameter of the first-level circular user interface object. In some implementations, illustrated separation of first-level user interface objects, labels, indicators, badges, etc. can be compressed or removed to fit within available space within the decreased diameter first-level circular user interface object. From 210, method 200 proceeds to 212.

At 212, a second-level circular user interface object with a second-level user interface object representing a second-level data object associated with a first-level data object is displayed. In some implementations, the second-level circular user interface object can be divided into at least one region where associated second-level user interface objects are displayed. In some implementations, a second-level user interface object can represent two or more second-level business objects. In some implementations, the second-level circular user interface object can have an inner circular edge and an outer circular edge. In some implementations, at least one second-level data object can be displayed within the area formed by the inner circular edge and the outer circular edge of the second-level circular user interface object. In some implementations, the inner circular edge of the second-level circular user interface object can be attached to an outer edge of the first-level circular user interface object. In some implementations, the collective diameter of the first-level circular user interface object and the second-level circular user interface object can correspond to what was previously the diameter of the first-level circular user interface object. In some implementations, if no second-level data objects are associated with a selected first-level data object, the second-level circular user interface object and associated second-level user interface object is not displayed. In this case, an indication may be made to the user that there are no second-level data objects associated with the selected first-level data object.

The indication may be, for example, sound, color, text, animation, or another suitable indicator. A prompt to open or access the first-level data object, if applicable, may be generated. In other implementations, the second-level circular user interface object may be displayed in an empty and non-selectable state. In some implementations, selecting another first-level user interface object can reset the selection indication of the first-level user interface object and/or display a new second-level circular user interface object associated with the selected another first-level user interface object. The second-level circular user interface object and the second-level user interface object may be displayed differently to indicate their difference, relative importance, relative size of their particular contents, order of access, date of creation, date of modification, security access level necessary to access, relative value, or any other suitable distinguishing characteristic, value and/or attribute. Displaying differently may mean, for example, different colors, sizes, shapes, or any other suitable indicator. From 212, method 200 proceeds to 214.

At 214, a determination is made whether an indication of a selection of a second-level user interface object was received. Selecting may be performed as described above with regard to selecting a first-level user interface object. If the second-level user interface object is not determined to be selected (i.e., after a predetermined period of time), method 200 may stay at 214 until a selection is made. In some instances, if no selection is determined, method 200 may proceed to some other point in the process flow. Responsive to a determination that an indication of a selection of a first-level user interface object was received, method 200 proceeds to 216. At 216, the selection of the second-level user interface object is indicated. Indication may be made as described above with regard to the selection indication of the first-level user interface object. In some implementations, the indication can be persistent. In other implementations, the indication may not be persistent. In some implementations, selecting another first-level user interface object can reset the selection indication of the selected second-level user interface object and indicate the selection of another second-level user interface object associated with the another first-level user interface object. In some implementations, the selected second-level circular user interface object can rotate automatically to orient the selected second-level user interface object into a predefined orientation. The predefined orientation may be any distinct position on a circular angle. In some implementations, all selected objects are aligned on the same circular angle. In some implementations, the rotation of the second-level circular user interface object can also automatically rotate the first-level circular user interface object. From 216, method 200 proceeds to 218.

At 218, the second-level circular user interface object rotates automatically to orient the selected second-level user interface object into a predefined position as described above. In some implementations, rotation can be clockwise, counterclockwise, or instantaneous. In some implementations, any labels associated with the selected second-level user interface object and other associated second-level user interface objects can rotate automatically to remain in an orientation conducive to viewing and reading. In some implementations, the selected second-level user interface object is aligned on the same circular angle with an associated selected first-level user interface object. From 218, method 200 proceeds to 220.

At 220, a collective diameter of a first-level circular user interface object and a second-level circular user interface object is decreased. In some implementations, associated first-level user interface objects and second-level user interface objects can also decreased in size to fit within the collective deceased diameter of the first-level circular user interface object and the second-level circular user interface object. In some implementations, the decrease in size of the associated first-level user interface objects and second-level user interface objects can be proportional to the decrease in size of the collective diameter of the first-level circular user interface object and the second-level circular user interface object. In some implementations, illustrated separation of first-level user interface objects and second-level user interface objects along with associated labels, indicators, badges, etc. can be compressed or removed to fit within available space within the decreased collective diameter of the first-level circular user interface object and the second-level circular user interface object.. From 220, method 200 proceeds to 222.

At 222, a third-level circular user interface object with a third-level user interface object representing a third-level data object associated with a second-level data object is displayed. In some implementations, the third-level circular user interface object can be divided into at least one region where associated third-level user interface objects are displayed. In some implementations, a third-level user interface object can represent two or more third-level business objects. In some implementations, the third-level circular user interface object can have an inner circular edge and an outer circular edge. In some implementations, at least one third-level data object can be displayed within the area formed by the inner circular edge and the outer circular edge of the third-level circular user interface object. In some implementations, the inner circular edge of the third-level circular user interface object can be attached to an outer edge of the second-level circular user interface object. In some implementations, the collective diameter of the first-level circular user interface object the second-level circular user interface object and the third-level circular user interface object can correspond to what was previously the collective diameter of the first-level circular user interface object and the second-level circular user interface object. In some implementations, if no third-level data objects are associated with a selected second-level data object, the second-level circular user interface object and associated second-level user interface object is not displayed. In this case, an indication may be made to the user that there are no third-level data objects associated with the selected second-level data object. The indication may be similar to that as described above with regard to a selected first-level user interface object with no associated second-level data objects. A prompt to open or access the second-level data object, if applicable, may then be generated. In other implementations, the third-level circular user interface object may be displayed in an empty and non-selectable state. In some implementations, selecting another first-level user interface object or second-level user interface object can reset the selection indication of the selected another first-level user interface object and/or another second-level user interface object. In these implementations, a new second-level circular user interface object and/or a new third-level circular user interface object associated with the selected another first-level user interface object or another second-level user interface object may be displayed. The third-level circular user interface object and third-level user interface object may be displayed differently to indicate their difference, relative importance, relative size of their particular contents, order of access, date of creation, date of modification, security access level necessary to access, relative value, or any other suitable distinguishing characteristic, value and/or attribute. Displaying differently may mean, for example, different colors, sizes, shapes, or any other suitable indicator. After 222, method 200 stops.

While the disclosure describes a concentric hierarchical list browser in terms of displaying three levels, the concentric hierarchical list browser is not limited to display only three levels. Those of ordinary skill will recognize that the concentric hierarchical list browser may display a multitude of levels.

Figure 3A:
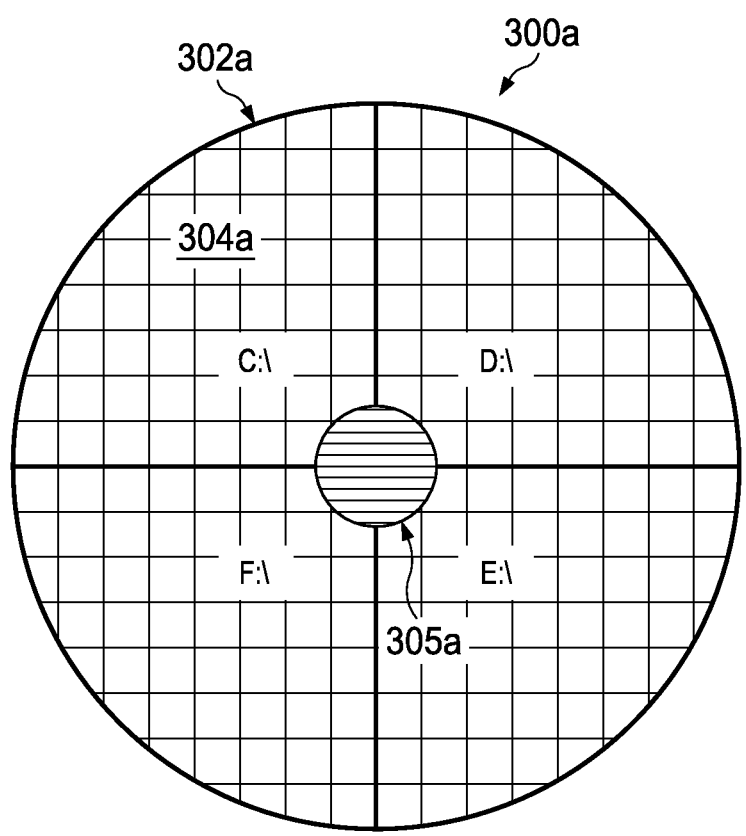

Referring now to FIG. 3A, FIG. 3A illustrates an example first-level circular user interface object 302a. A first-level user interface object 304a is shown representing a first-level data object (i.e., disk drive C:\ of a set of physical and/or virtual disk drives). Also shown are other first-level user interface objects for disk drives D:\, E:\, and F:\. While the first-level user interface object 304a is illustrated to be in a wedge or pie shape and part of a clockwise oriented progression of represented first-level data objects, a shape of the first-level user interface object 304a may be in any suitable shape and the orientation/placement of first-level user interface object 304a may be in any suitable orientation/placement. In some implementations, the shape of the first-level user interface object 304a can be adjusted. In some implementations, the placement of the first-level user interface object 304a can be adjusted. In some implementations, the shape or placement adjustment can be performed automatically or manually to indicate difference, relative importance, relative size of particular contents, order of access, date of creation, date of modification, security access level necessary to access, relative value, or any other suitable distinguishing characteristic, value and/or attribute.

In some implementations, a first-level circular user interface object 302a can be rotated. In these implementations, a first-level user interface object 304a (and other associated first-level user interface objects) may be rotated with the first-level circular user interface object 302a. For example, rotation of the first-level circular user interface object 302a may be performed by selecting the first-level user interface object 304a with a mouse pointer, gesture, stylus, or any suitable selection method and dragging the first-level user interface object 304a around on the display. In this implementation, the first-level circular user interface object 302a and associated first-level user interface objects would rotate. One of ordinary skill will recognize that other user interface devices and methods could also be used to provide rotation functionality.

In some implementations, a first-level circular user interface object 302a can be resized. Resizing may be performed by, for example, selecting, clicking, multi-clicking, dragging, gestures, multi-touch, pinching, an algorithm, voice control, and any other suitable resizing method or operation. In these implementations, a first-level user interface object 304a (and other associated first-level user interface objects) may be resized to fit within the decreased-diameter first-level circular user interface object 302a.

FIG. 3A also illustrates a default state user interface object 305a situated in the middle of the first-level circular user interface object 302a. In some implementations the default state user interface object 305a can be situated at any location internal or external to a concentric hierarchical list browser. In some implementations, selecting the default state user interface object 305a can perform a back and/or undo function as understood by one of ordinary skill.

Referring now to FIG. 3B, FIG. 3B illustrates a second-level circular user interface object 306b attached to a first-level circular user interface object 302b following the selection of a first-level user interface object 304b. The first-level user interface object 304b is shown selected by different shading. The first-level circular user interface object 302b is also shown automatically rotated 303b to orient the first-level user interface object 304b to the upper portion of the first-level circular user interface object 302b. Also, shown is a decrease in the diameter of the first-level circular user interface object 302b following the selection of the first-level user interface object 304b and a decrease in the sizes of the first-level user interface object 304b (and other associated first-level user interface objects) to fit within the decreased-diameter first-level circular user interface object 302b.

A second-level user interface object 308b representing a second-level data object (e.g., a directory D5) is shown. While the second-level user interface object 308b is illustrated to be in a wedge-type shape and part of a clockwise oriented progression of represented second-level data objects (i.e., directories D1-Dn), a shape of the second-level user interface object 308b may be any suitable shape and the orientation/placement of the second-level user interface object 308b may be in any suitable orientation/placement. In some implementations, the shape of the second-level user interface object 308b may be adjusted. In some implementations, the placement of the second-level user interface object 308b can be adjusted. In some implementations, the shape or placement adjustment can be performed automatically or manually to indicate difference, relative importance, relative size of particular contents, order of access, date of creation, date of modification, security access level necessary to access, relative value, or any other suitable distinguishing characteristic, value and/or attribute.

In some implementations, a second-level circular user interface object 306b can be rotated independently of an attached first-level circular user interface object 302b. In other implementations, rotation of the first-level circular user interface object 302b or the second-level circular user interface object 306b rotates any other attached circular user interface object.

In some implementations, a collective diameter of a first-level circular user interface object 302b and a second-level circular user interface object 306b can be resized. Resizing may be performed as described above with regard to the resizing of the first-level circular user interface object 302b. In these implementations, a first-level user interface object 304b (and other associated first-level user interface objects) and a second-level user interface object 306b (and other associated second-level user interface objects) may be resized to fit within a decreased collective diameter of the first-level circular user interface object 302b and the second-level circular user interface object 306b.

FIG. 3B also illustrates a default state user interface object 305b situated in the middle of the first-level circular user interface object 302b. In some implementations, selecting the default state user interface object 305b can perform a back and/or undo function as understood by one of ordinary skill. For example, a selection of the default state user interface object 305b can revert the concentric hierarchical list browser as illustrated in FIG. 3B back to the concentric hierarchical list browser state as illustrated in FIG. 3A or to some other intermediate state.

Figure 3C:
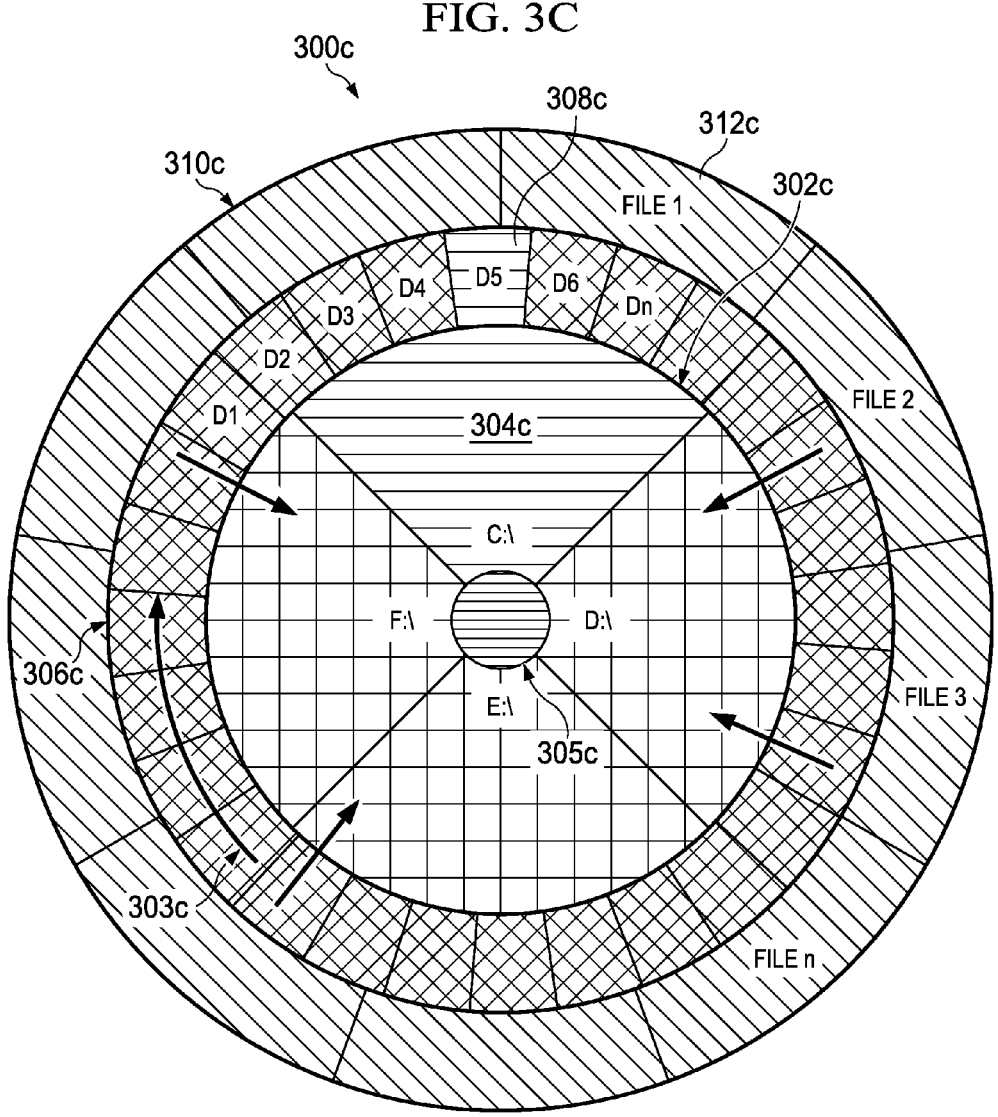

Referring now to FIG. 3C, FIG. 3C illustrates a third-level circular user interface object 310c attached to a combined first-level circular user interface object 302c and second-level circular user interface object 306c following a selection of a second-level user interface object 308c. The second-level user interface object 308c is shown selected by different shading. The second-level circular user interface object 306c is also shown automatically rotated 303c to orient the second-level user interface object 308c to be aligned on a circular angle with a selected first-level user interface object 304c. Also shown is a decrease in the collective diameter of the first-level circular user interface object 302c and the second-level circular user interface object 306c following the selection of the second-level user interface object 308c and a decrease in the sizes of a first-level user interface object 304c (and other associated first-level user interface objects) and the second-level user interface object 308c (and other associated second-level user interface objects) to fit within the decreased-diameter first-level circular user interface object 302c and the second-level circular user interface object 306c.

A third-level user interface object 312c representing a third-level data object (e.g., a file, FILE 1) is shown. While the third-level user interface object 312c is illustrated to be in a wedge-type shape and part of a clockwise oriented progression of represented third-level data objects (i.e., files FILE 1-FILE n), a shape of the third-level user interface object 312c may be any suitable shape and the orientation/placement of the third-level user interface object 312c may be in any suitable orientation/placement. In some implementations, the shape of the third-level user interface object 312c can be adjusted. In some implementations, the placement of the third-level user interface object 312c can be adjusted. In some implementations, the shape or placement adjustment can be performed automatically or manually to indicate difference, relative importance, relative size of particular contents, order of access, date of creation, date of modification, security access level necessary to access, relative value, or any other suitable distinguishing characteristic, value and/or attribute.

In some implementations, a third-level circular user interface object 306c can be rotated independently of an attached first-level circular user interface object 302c and second-level circular user interface object 306c. In other implementations, rotation of the first-level circular user interface object 302c, the second-level circular user interface object 306c, or the third-level circular user interface object 310c rotates any other attached circular user interface object.

In some implementations, a collective diameter of a first-level circular user interface object 302c, a second-level circular user interface object 306c, and a third-level circular user interface object 310c can be resized. Resizing may be performed as described above with regard to the resizing of the first-level circular user interface object 302c. In these implementations, a first-level user interface object 304c (and other associated first-level user interface objects), a second-level user interface object 306c (and other associated second-level user interface objects), and a third-level user interface object 310c (and other associated third-level user interface objects) may be resized to fit within a decreased collective diameter of the first-level circular user interface object 302c, the second-level circular user interface object 306c, and the third-level user interface object 310c.

FIG. 3C also illustrates a default state user interface object 305c situated in the middle of the first-level circular user interface object 302c. In some implementations, selecting the default state user interface object 305c can perform a back and/or undo function as understood by one of ordinary skill. For example, a selection of the default state user interface object 305c can revert the concentric hierarchical list browser as illustrated in FIG. 3C back to the concentric hierarchical list browser state as illustrated in FIG. 3B, FIG. 3A, or to some other intermediate state.

Figure 4:
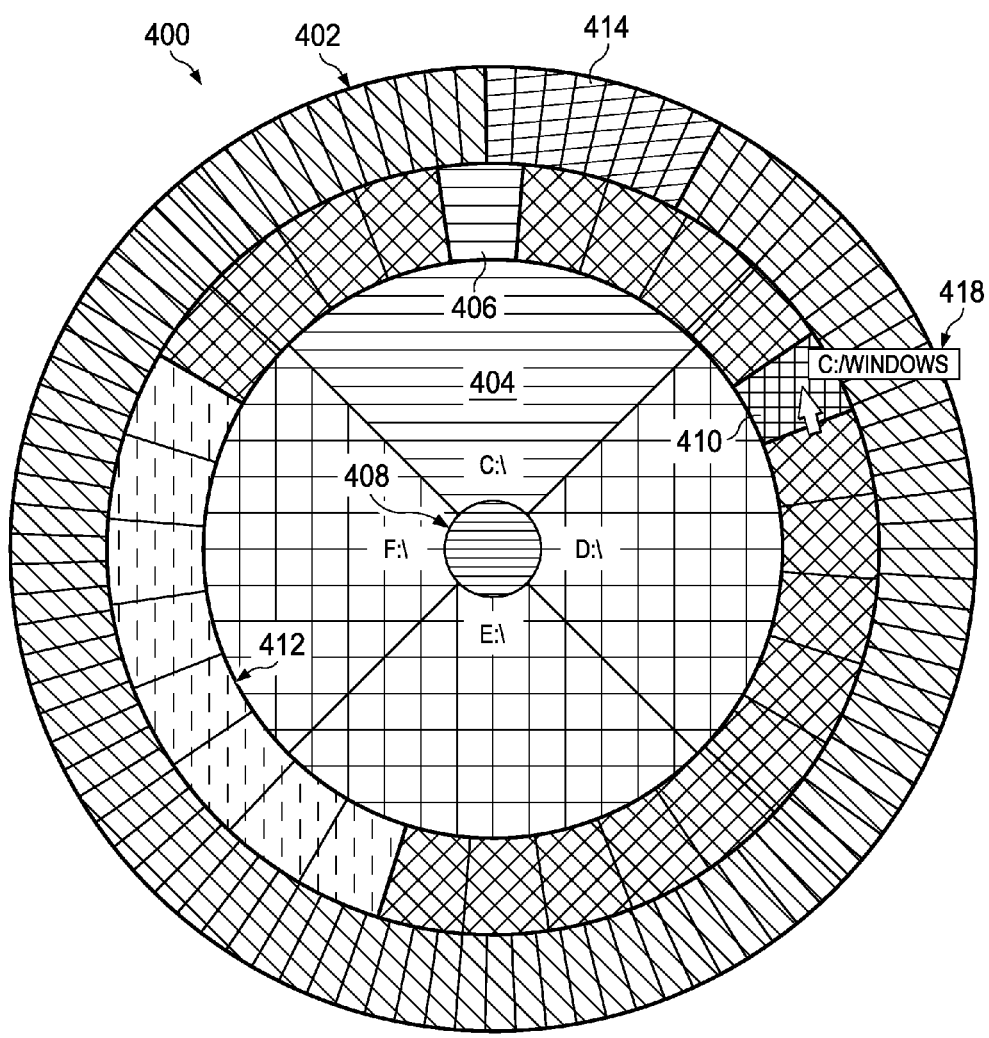
FIG. 4 illustrates an example implementation of a concentric hierarchical list browser.

Referring now to FIG. 4, FIG. 4 illustrates a three-level circular user interface 402 (shown enlarged for detail) generated as a result of the selection of first-level user interface object 404 and second-level user interface object 406. A default state user interface object 408 is shown situated in the middle of a first-level circular user interface object and operates as previously described with respect to FIGS. 3A-3C.

In some implementations, user interface objects can be displayed differently to indicate their difference, relative importance, relative size of their particular contents, order of access, date of creation, date of modification, security access level necessary to access, relative value, or any other suitable distinguishing characteristic, value and/or attribute. Displaying differently may mean, for example, different colors, sizes, shapes, graphical effect (e.g., shadow, bevel, etc.), or any other suitable indicator. For example, second-level user interface objects 410 and 412 are displayed differently to indicate a directory and files, respectively. For example, first-level user interface objects representing a set of physical and/or virtual disk drives may each be displayed differently depending on whether the drives are physical or virtual, local or network, etc. Likewise, in some implementations, empty directories can be readily identifiable by how the empty directories are displayed (e.g., specific color, graphical effect, etc.). In some implementations, empty directories can also not be selectable. Likewise, third-level user interface objects 414 are shown differently than other third-level user interface objects because they are of a different data object type.

In some implementations, a user interface object can be selected and an associated layer circular user interface object scrolled. In these implementations, an identifier for the data object associated with the currently selected user interface object may be displayed as the associated layer circular user interface object is scrolled to quickly identify a data object. For example, a computer mouse could be used to select the user interface object and a mouse wheel used to scroll the associated layer circular user interface object. In another implementation, gesture-based actions may be used to perform scrolling. One of ordinary skill will recognize that other user interface devices and methods could also be used to provide scrolling functionality.

In some implementations, a user interface object can be selected and/or hovered over to provide additional information about the data object associated with the user interface object. For example, FIG. 4 illustrates a standard mouse pointer hovering over second-level user interface object 410 and additional information 418 associated with second-level user interface object 410 displayed. The additional information may be provided by a thumbnail, exploded view, text, badge, audio, video, and/or any other suitable information conveying method.

In some implementations, a general reset of the entire circular user interface may be performed after a predetermined period of time, a predetermined period of time with no activity, a response to a request to clear the circular user interface via a user interface object, or other suitable indication, flag, algorithm, etc. One of ordinary skill will recognize other methods to perform the general reset.

In some implementations, selection of a user interface object may not result in a reduction of the diameter of the associated circular user interface object or associated sub-layer circular user interface objects. In other implementations, individual circular user interface objects may have their diameters reduced while other layer circular user interface objects remain the same size.

Figure 5:
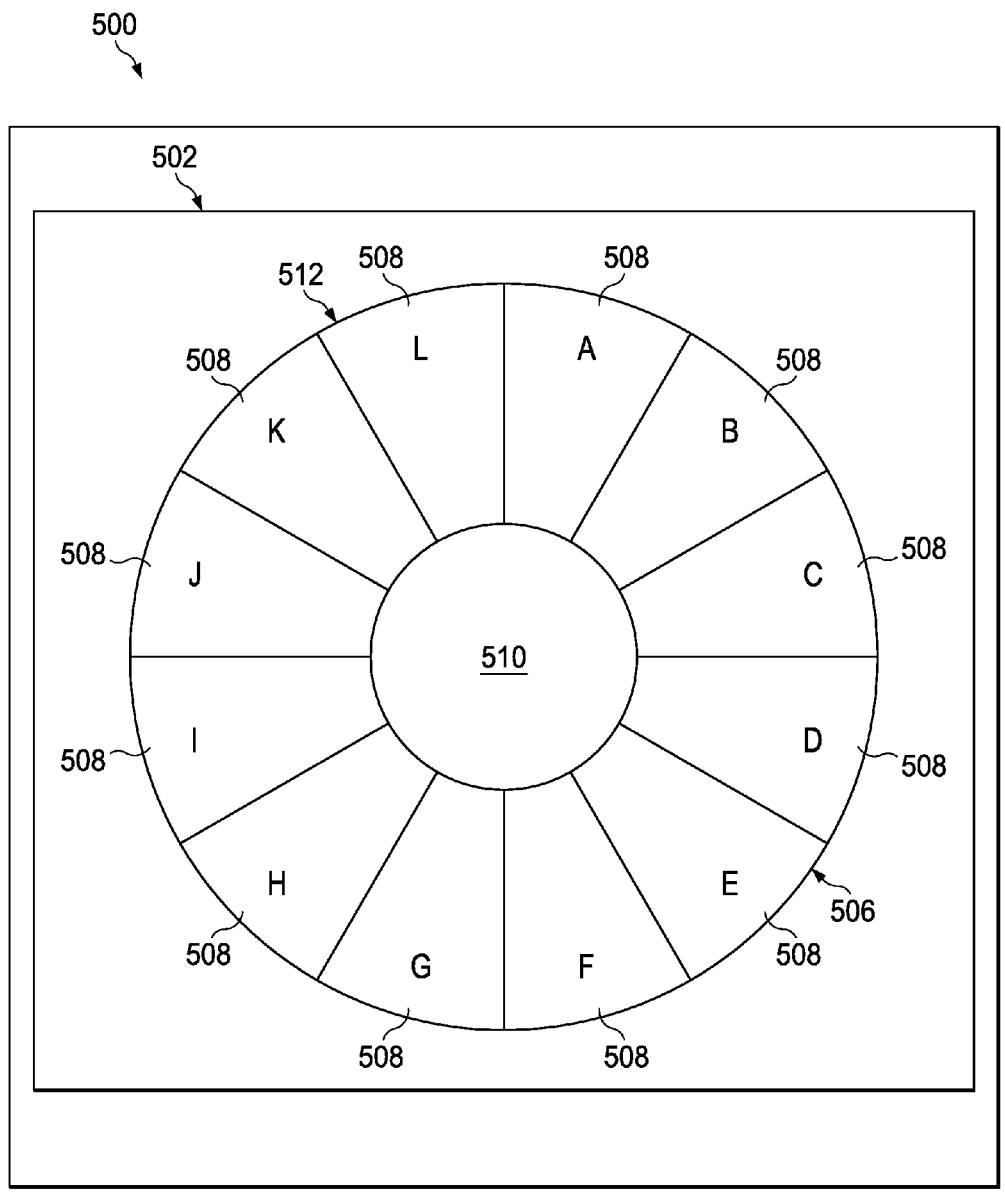
FIG. 5 illustrates a mobile computing device according to an implementation of the disclosure.

FIG. 5 shows an implementation of a system for browsing hierarchically structured data. In this implementation the system is a mobile computing device 500. The mobile computing device 500 has a touchpad display 502. In the middle of the touchpad display is displayed a first-level circular user interface object 506. This is a graphical user interface which a user can interact with by touching. In a pi-like structure within the first-level circular user interface object there are individual first-level selector objects 508. To differentiate between these are labeled A-L. Text and/or graphical information could be displayed in these first-level selector objects. During the operation when an operator puts his or her finger over a first-level selector object 508 additional information may be displayed some place on the screen such as where the individual is touching or in a different location. In the center of the first-level circular user interface object 506 there is a fourth user interface object 510 which may also be referred to as a navigation user object. Additional graphical user interface controls may be placed within the circle 510 to help the user traverse different levels of the interface objects and also possibly to return to the first level circular interface object. The first-level circular interface object is surrounded by an outer circular edge 512.

Figure 6:
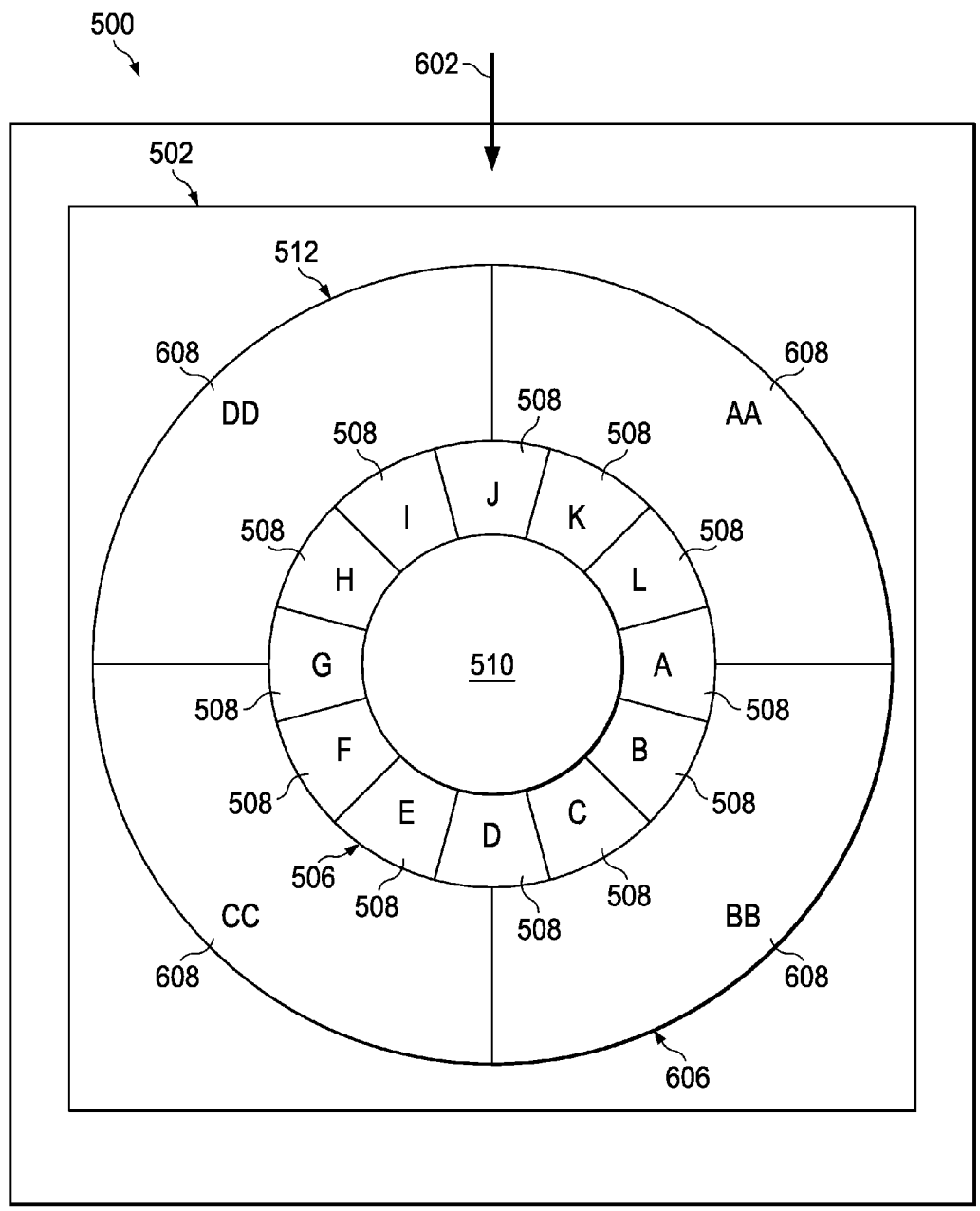
FIG. 6 illustrates the mobile computing device of FIG. 5 after a first level selector object has been selected.

FIG. 6 shows another view of the mobile computing device 500. In this view the first-level selector object labeled J has been selected. In this case the selection of J 508 is indicated by its orientation relative to the mobile computing device 500. The arrow 602 indicates a chosen orientation with an arrow. The first-level selector object 508 labeled J has been rotated into the top position in alignment with the arrow 602. This is to indicate that J has been selected. The first-level circular interface object has had its diameter reduced. It is still displayed around the fourth user interface object 510. Around the first-level circular interface object 506 a second-level circular interface object 606 has been placed. It is between the first-level circular interface object 506 and the outer circular edge 512. It can be seen that the entire graphical user interface is within the boundary of the outer circular edge 512. The advantage of this is particularly evident when it is displayed on a mobile computing device 500. The size of the interface has stayed the same although a greater amount of information is displayed. The second-level circular interface object 606 comprises in this example four second-level selector objects 608. These are labeled AA, BB, CC, and DD. The user of the mobile computing device may select any of these four 608 and in this case then the second-level circular interface object 606 would reduce in size and a third-level circular interface object would be displayed around this. In principle this may be continued for any number of hierarchies.

Figure 7:
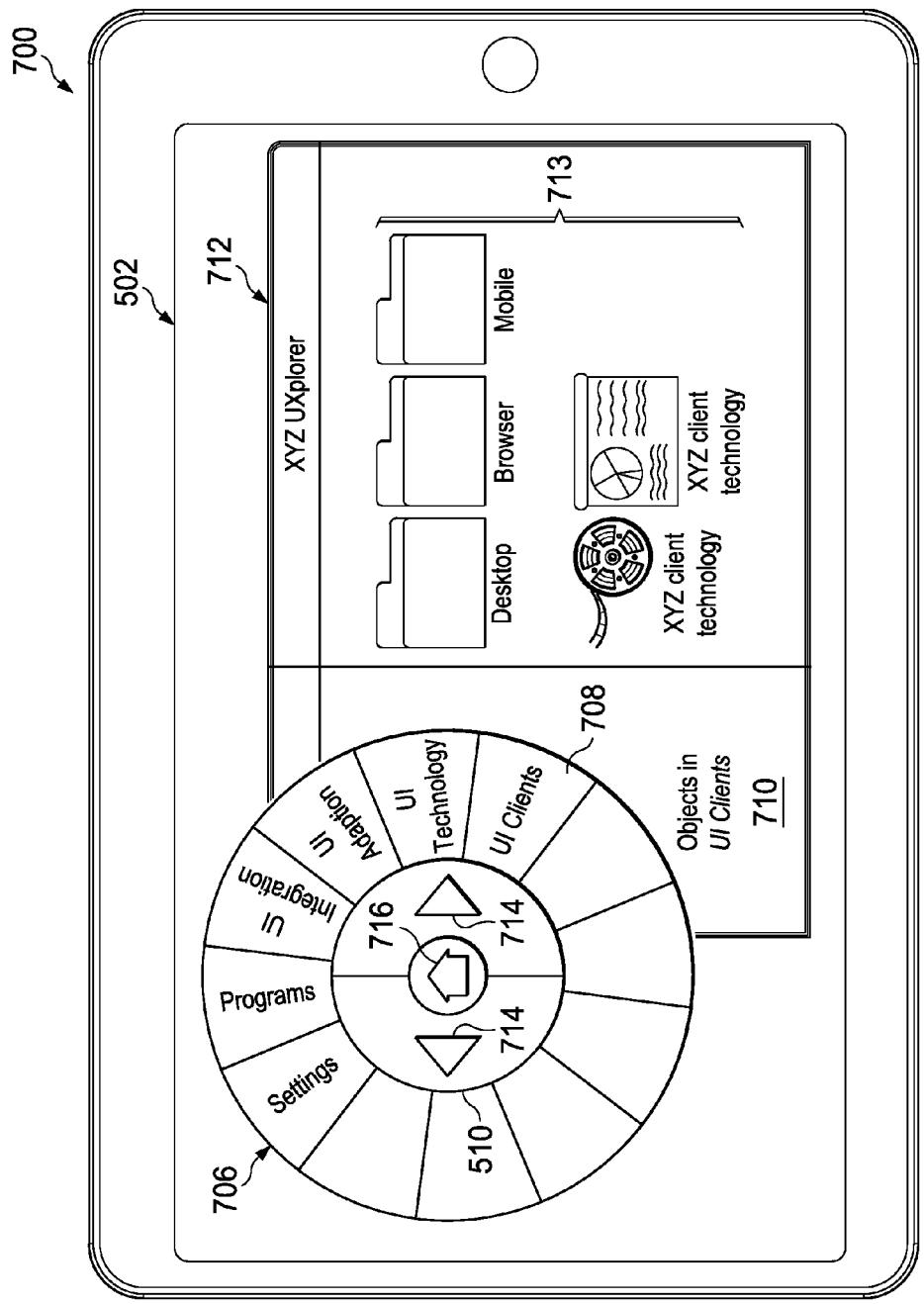
FIG. 7 illustrates a mobile computing device according to a further implementation of the disclosure.

FIG. 7 shows a further example of a mobile computing device 700 according to an implementation of the disclosure. This mobile computing device 700 also comprises a touchpad display 502. In this example there is a circular interface object 706 displayed. This circular interface object 706 is intended to be representative and may be a first, second, third, or higher-level circular interface object. The fourth user interface object 510 or navigation user object is displayed again in the center of the circular interface object 706. The fourth user interface 510 comprises two buttons for traversing the various levels 714 of the circular interface objects and also contains a home selector 716 which returns the graphical user interface to the first-level circular interface object. In this example there is a selected selector object 708. The selected selector object 708 has been expanded into a rectangular user interface object 712. The rectangular user interface object 712 has a label 710 and in this case shows the contents of a directory 713. Showing the contents of a directory is intended to be representative. Other things such as applications, music to select, or other data may also be displayed in the rectangular user interface object 712.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method for browsing hierarchically structured data, comprising:
displaying on a display a first-level circular user interface object with at least one first-level selector object, wherein the first-level circular user interface object is a first graphical user interface object with a first circular form, wherein the at least one first-level data object represents a first level of the hierarchically structured data, wherein the first-level circular user interface object has an outer circular edge with a first diameter, wherein the first diameter is equal to an initial diameter; and
responsive to receiving a first selection of one of the at least one first-level selector object and by operation of a computer:
rotating the first-level circular user interface object to orient the at least one first-level selector object to stop at a predefined orientation used to align all selected selector objects on the same circular angle;
indicating the first selection on the display in response to receiving the selection;
decreasing the first diameter in response to receiving the selection; and
displaying a second-level circular user interface object with at least one second-level selector object in response to the first selection, wherein the second-level circular user interface object is a second graphical user interface object with a second circular form, wherein the second-level circular user interface is operable for receiving a second selection of one of the at least one-second level selector objects, wherein the at least one second-level data object represents a second-level branch of a second level of the hierarchically structured data, wherein the first branch is determined by the first selection, wherein the second-level circular user interface object has an inner circular edge and an outer circular edge, and wherein the inner circular edge of the second-level circular user interface object is attached to the outer circular edge of the first-level circular user interface object.

2. The computer-implemented method of claim 1, wherein the outer circular edge of the second-level circular user interface has a diameter less than or equal to the initial diameter.

3. The computer-implemented method of claim 1, further comprising:
responsive to receiving a second selection of one of the at least one second-level selector object:
rotating the second-level circular user interface object to orient the at least one second-level selector object to stop at the predefined orientation;

indicating the second selection on the display in response to the second selection;

decreasing the diameter of the first-level circular user interface object and the second-level circular user interface object in response to the second selection; and displaying a third-level circular user interface object with least one third-level selector object in response to the second selection, each representing a third-level data object associated with the second selection, wherein the third-level circular user interface object is a third graphical user interface object with a third circular form, wherein the third-level circular user interface is operable for receiving a third selection of one of the at least one third-level selector object, wherein the at least one third-level data object represents a third-level branch of a third level of the hierarchically structured data, wherein the third-level branch is determined by the second selection, wherein the third-level circular user interface object has an inner circular edge and an outer circular edge, and wherein the inner circular edge of the third-level circular user interface object is attached to the outer circular edge of the second-level circular user interface object.

4. The computer-implemented method of claim 3, wherein the outer circular edge of the third-level circular user interface has a diameter less than or equal to the initial diameter.

5. The computer-implemented method of claim 1, wherein the hierarchically structured data has a tree like structure with m-levels, wherein m is greater than or equal to 2, wherein the method further comprises:

responsive to receiving a nth selection of one of the at least one n-level selector object, wherein n is less than m:
rotating the n-level circular user interface object to orient the at least one n-level selector object to stop at the predefined orientation;
indicating the nth selection on the display in response to receiving the nth selection;
decreasing a nth outer diameter of an n-level circular interface object in response to receiving the nth-selection; and
displaying an n+1-level circular user interface object with at least one n+1-level selector object in response to the nth selection, wherein the n+1-level circular user interface object is a n+1 graphical user interface object with a n+1 circular form, wherein the n+1-level circular user interface is operable for receiving a n+1 selection of one of the at least one n+1- level selector objects, wherein the at least one n+1-level data object represents a n+1-level branch of an n+1 level of the hierarchically structured data, wherein the n+1 branch is determined by the nth selection, wherein the n+1-level circular user interface object has an inner circular edge and an outer circular edge, and wherein the inner circular edge of the n+1-level circular user interface object is attached to the outer circular edge of the n-level circular user interface object.

6. The computer implemented method of claim 1, further comprising:
receiving a fourth selection of one of the at least one second-level user interface objects:
indicating the fourth selection on the display in response to the selection, and
displaying on the display a rectangular user interface object at least partially outside of the outer circular edge in response to the fourth selection.

7. The computer-implemented method claim 1; wherein resizing of the first-level circular user interface object is performed by at least one of selecting, clicking, multi-clicking, dragging, multi-touch, pinching, an algorithm, or voice control.

8. The computer-implemented method claim 1, further comprising displaying, in the first-level circular user interface object, a navigation user interface object.

9. The computer-implemented method of claim 8, wherein the navigation user interface object performs an undo function when selected.

10. The computer implemented method of claim 1, wherein the hierarchically structured data represents internal machine states.

11. The computer implemented method of claim 1, wherein each of the at least one first-level selector objects is displayed as a portion of the first-level circular user interface object.

12. The computer implemented method of claim 1, wherein each of the at least one first-level selector object represents data selected from the hierarchically structured data.

13. The computer implemented method of claim 7, further comprising: displaying on the display a first-level icon within the boundary of the outer circular edge during receiving the selection of the at least one first-level selector object.

14. A computer-accessible, non-transitory, storage medium encoded with computer-readable instructions configured to cause one or more data processing apparatus to:
display on a display a first-level circular user interface object with at least one first-level selector object, wherein the first-level circular user interface object is a first graphical user interface object with a first circular display form, wherein the at least one first-level data object represents a first level of hierarchically structured data, wherein the first-level circular user interface object has an outer circular edge with a first diameter, wherein the first diameter is equal to an initial diameter; and
responsive to receiving a first selection of one of the at least one first-level selector object:
rotating the first-level circular user interface object to orient the at least one first-level selector object to stop at a predefined orientation used to align all selected selector objects on the same circular angle;
indicate the first selection on the display in response to receiving the selection;
decrease the first diameter in response to receiving the selection; and
display a second-level circular user interface object with at least one second-level selector object in response to the first selection, wherein the second-level circular user interface object is a second graphical user interface object with a second circular form, wherein the second-level circular user interface is operable for receiving a second selection of one of the at least one-second level selector objects, wherein the at least one second-level data object represents a second-level branch of a second level of the hierarchically structured data, wherein the first branch is determined by the first selection, wherein the second-level circular user interface object has an inner circular edge and an outer circular edge, and wherein the inner circular edge of the second-level circular user interface object is attached to the outer circular edge of the first-level circular user interface object.

15. A computer system comprising:
memory for storing machine executable instructions; and
a processor operable for executing the machine executable instructions, wherein execution of the instructions cause the processor to:
   display on a display a first-level circular user interface object with at least one first-level selector object, wherein the first-level circular user interface object is a first graphical user interface object with a first circular form, wherein the at least one first-level data object represents a first level of the hierarchically structured data, wherein the first-level circular user interface object has an outer circular edge with a first diameter, wherein the first diameter is equal to an initial diameter; and
   responsive to receipt of a first selection of one of the at least one first-level selector object:
      rotate the first-level circular user interface object to orient the at least one first-level selector object to stop at a predefined orientation used to align all selected selector objects on the same circular angle;
      indicate the first selection on the display in response to receiving the selection;
      decrease the first diameter in response to receiving the selection; and
      display a second-level circular user interface object with at least one second-level selector object in response to the first selection, wherein the second-level circular user interface object is a second graphical user interface object with a second circular form, wherein the second-level circular user interface is operable for receiving a second selection of one of the at least one-second level selector objects, wherein the at least one second-level data object represents a second-level branch of a second level of the hierarchically structured data, wherein the first branch is determined by the first selection, wherein the second-level circular user interface object has an inner circular edge and an outer circular edge, and wherein the inner circular edge of the second-level circular user interface object is attached to the outer circular edge of the first-level circular user interface object.

* * * * *